2,965,687
SELECTIVE SORPTION OF ORGANIC VAPORS

Arthur Loten Roberts, Colin Thomas Cowan, and Donald White, Leeds, England, assignors to The Gas Council, London, England, a British body corporate No Drawing. Filed May 19, 1959, Ser. No. 814,173

Claims priority, application Great Britain May 27, 1958

10 Claims. (Cl. 260—674)

This invention is for improvements in or relating to selective sorption of organic vapors and is particularly concerned with the selective sorption of organic vapors from gases, vapors or mixtures thereof.

It is known that natural clay materials, as well as certain synthetic materials resembling them, are capable of entering into ion-exchange relationship with organic molecules which contain functional groups suitable for replacing inorganic cations in the mineral structure.

It is also known that certain of these minerals, of which montmorillonite is an example, have expanding lattice structures, in which the structural elements are arranged in layers, or lamellae. Organic material may enter between the lamellae with consequent expansion of the interlamellar distance.

When organic molecules of the kind described form organo-clay derivatives with clay minerals possessing ion-exchange capabilities and expanding lattices, the proportion of the basal planes of the lamellae covered by the organic molecules varies according to the size of the molecules concerned.

We have now found that, where substantially the whole of the basal plane area of the lamellae is covered by organic molecules, or where the amount of organic material in the derivative is in excess of that required for total coverage, the resulting organo-clay derivative has remarkable properties for selective sorption, and may be applied, for example, to the separation of aromatic hydrocarbons from aliphatic hydrocarbons in the vapor phase. When the organo constituent is quaternary ammonium, substantial coverage of the basal plane area is achieved with quaternary ammonium constituents containing not less than a total of 20 carbon atoms.

According to the present invention there is provided a process for selective sorption of organic vapors which process comprises the selective sorption from gases, vapors or mixtures thereof of the organic vapors on a sorbent comprising a quaternary ammonium derivative of a clay of the type described, said quaternary ammonium constituent of the organo-clay derivative containing not less than a total of 20 carbon atoms and being present in an amount of from 17 to 36 percent by weight on the weight of the derivative. Preferably the quaternary ammonium constituent of the organo-clay derivative contains not less than a total of 30 to 50 carbon atoms.

The adsorbed organic compound may be recovered from the organo-clay derivative for example by the application of heat.

In order to provide a derivative having selective sorption properties a clay mineral of the type described must be of the expanding lattice type and must have high ion-exchange characteristics. Again, such selective sorption properties are dependent on the amount of organic material in the derivative, and this must be sufficient to provide at least substantially complete coverage of the basal plane area of the lamellae. For the same reason, the size of the molecule must be great enough to provide such substantially complete coverage when all the available cation sites are occupied.

Preferred clays are natural clays of which montmorillonite is the principal constituent e.g. fuller's earth or bentonite, although certain alumina/silica materials resembling montmorillonite may be substituted.

The organic compounds used to prepare the derivatives are quaternary ammonium bases or salts, which form the derivatives by ion exchange with the inorganic cations in clay structure. A preferred organo-clay derivative is the dimethyl dioctadecyl ammonium derivative of the clay, and this material is particularly suitable for the process of the invention. A preferred organo-clay derivative may be prepared from this material and bentonite, if the proportion of organo constituent in the derivative is present in an amount of between 17% and 36%, preferably between 33% and 35% by weight on the weight of the derivative.

An organo-clay derivative of the kind described may be prepared by the addition of the organic compound selected to a suspension of the clay in water.

The properties of selective sorption exhibited by such an organo-clay derivative are particularly effective in the sorption of aromatic hydrocarbons, and may be suitably applied to the separation of aromatic hydrocarbons from aliphatic hydrocarbons in the vapor phase. For example, when it is desired to extract aromatic hydrocarbons from fuel gases, they may be extracted by this method while leaving the aliphatic hydrocarbon substantially unaffected. Recovery of the sorbed aromatic hydrocarbons from the sorbent material yields a product substantially free from aliphatic hydrocarbons, and from which, for example, pure benzene may be more readily extracted than from the product obtained by conventional methods.

Sorbed products may be recovered for example by selective desorption from the sorbent material by the application of heat.

The process of the present invention may be applied to the selective adsorption of cyclic compounds containing one or more double bonds, for example, aromatics, alicyclics or heterocyclics. The process may also be used for the separation of isomers, e.g. the separation of meta and para xylenes, and of meta and para cresols. The cyclic compounds may be monocyclic or polycyclic.

Any method of bringing gases, vapors or mixtures thereof into contact with solids may be employed in the process of the present invention. The use of static sorption towers used alternately for sorption and recovery of product, and of continuous sorption towers in which fresh sorbent is continuously added at one point and spent sorbent is withdrawn at another point are preferred. Alternatively, a continuous technique may be used employing a sorption vessel with a fluidized bed of sorbent, a continuous bleed thereof and a continuous feed of gases, vapors or mixtures thereof.

Where static sorption towers are employed, two or more vessels will be provided, one or more of which will be in use in the process, while the other or others will be heated to remove the sorbed material from the sorbent.

Following is a description by way of example of methods of carrying the invention into effect.

Example 1

A mixture of ½ lb. of dimethyl dioctadecyl ammonium bentonite and 4 lbs. of a purified diatomaceous earth were packed into a column 36" long and 1" wide. Nitrogen containing 1.8 g. of benzene per cu. ft. was then passed through the column at the rate of 1 cu. ft. every 40 minutes at 20° C. The column totally removed the benzene from 4.7 cu. ft. of the mixture.

Example 2

With the same column and conditions as in Example 1 nitrogen containing 0.75 g. of toluene per cu. ft. was passed through the column when the toluene was totally removed from 11.0 cu. ft. of the mixture.

Example 3

Using the same column and conditions as in Example 1 nitrogen containing 1.8 g. each of benzene and cyclohexane was passed through the column and 4.7 cu. ft. of gas were recovered containing only 1.45 g. per cu. ft. of cyclohexane.

Example 4

½ lb. of dimethyl dioctadecyl ammonium bentonite was allowed to attain equilibrium with a large excess of nitrogen containing 10 g. of benzene per cu. ft. at 20° C. It was then found that the organo-clay derivative had adsorbed 33 g. of benzene.

Example 5

Purified coal gas from a vertical retort house provided a benzol containing 75% aromatic hydrocarbons, when washed with oil in a normal benzol plant. The remaining 25% consisted of aliphatic hydrocarbons, cycloparaffins and minor amounts of other materials, e.g. heterocyclic compounds. A sample or this benzol was revaporized with an inert gas carrier (nitrogen) to produce a mixture containing approximately 10% by volume of benzol vapor. The gas mixture was passed at a rate of 40 cu. ft. per hour through a column 9 feet long and 3 inches in diameter filled with granular dimethyl dioctadecyl ammonium bentonite containing 33.4% of organic material. When the column was saturated as evidenced by the break-through of aromatics, the flow of gas was stopped and adsorbed material desorbed by heating the column by external heating to 80° C. and passing a stream of inert gas at a rate of 5 cu. ft./hr. through the column. The hydrocarbons evolved were condensed by freezing them out of the inert carrier gas stream. The product on analysis was found to contain 93% by weight of aromatic hydrocarbons.

Example 6

The procedure of the previous example was repeated using a mixture of equal parts by weight of meta- and para-xylenes, instead of benzol, in a stream of an inert gas. The recovered product contained 42% by weight of para-xylene and 58% by weight of meta-xylene, thus illustrating the selective sorption properties which the dimethyl dioctadecyl ammonium bentonite possesses.

We claim:

1. A process for the separation of aromatic hydrocarbons from gases and vapors containing a member of the group consisting of aromatic hydrocarbons and a mixture of aromatic hydrocarbons and aliphatic hydrocarbons, which process comprises the selective sorption of the aromatic hydrocarbon on a sorbent consisting essentially of a quaternary ammonium derivative of a clay mineral possessing ion-exchange capabilities and expanding lattices, said quaternary ammonium constituent of the organo clay derivative containing not less than a total of 20 carbon atoms and being present in an amount of from 17 to 36 percent by weight on the weight of the derivative.

2. A process as claimed in claim 1 wherein the quaternary ammonium constituent contains a total of from 30 to 50 carbon atoms.

3. A process as claimed in claim 1 wherein the clay is a natural clay of which montmorillonite is the principal constituent.

4. A process as claimed in claim 3 wherein the clay is a member of the group consisting of fuller's earth and bentonite.

5. A process as claimed in claim 1 wherein the organo-clay derivative is the dimethyl dioctadecyl ammonium derivative of the clay.

6. A process as claimed in claim 5 wherein the dimethyl dioctadecyl ammonium constituent is present in an amount of from 33 to 35 percent by weight on the weight of the derivative.

7. A process as claimed in claim 1 wherein organo-clay derivative is employed to separate aromatic hydrocarbons from aliphatic hydrocarbons in the vapor phase.

8. A process as claimed in claim 1 wherein the organo-clay derivative is employed to extract aromatic hydrocarbons from fuel gases.

9. A process as claimed in claim 1 wherein the sorbed organic vapors are subsequently recovered from the organo-clay derivative.

10. A process as claimed in claim 9 wherein the sorbed organic vapors are recovered by the application of heat to the sorbent material.

References Cited in the file of this patent

UNITED STATES PATENTS 2,531,427      Hauser                Nov. 28, 1950

OTHER REFERENCES

Entel et al.: Article in "Analytical Chemistry," volume 25, Number 4, April 1953 (pages 616–618).